Aug. 19, 1947.         E. D. REIBER         2,426,051
CONTROL SWITCH
Filed Dec. 12, 1942
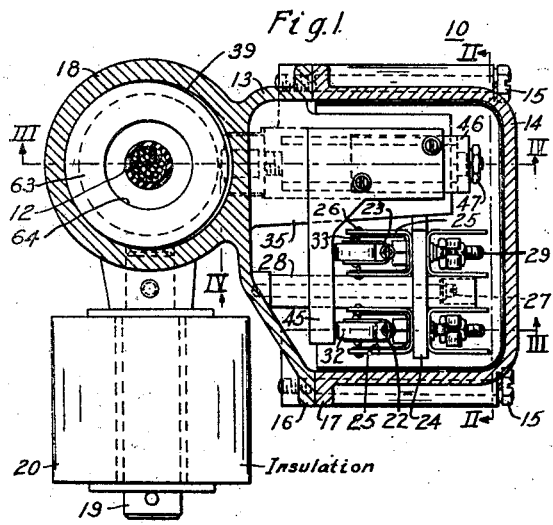
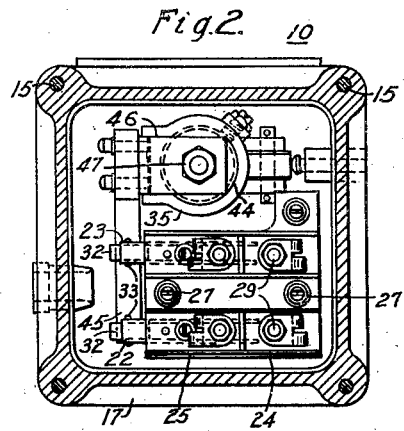
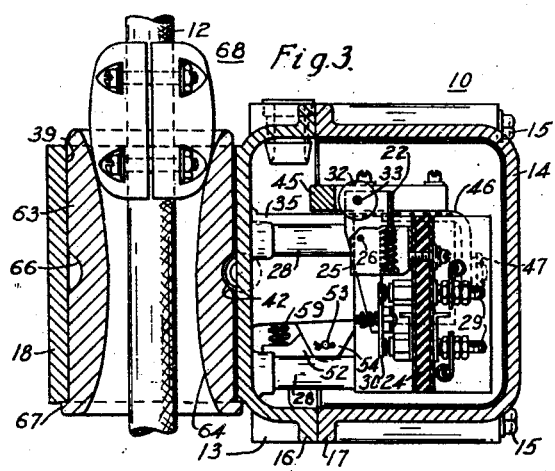
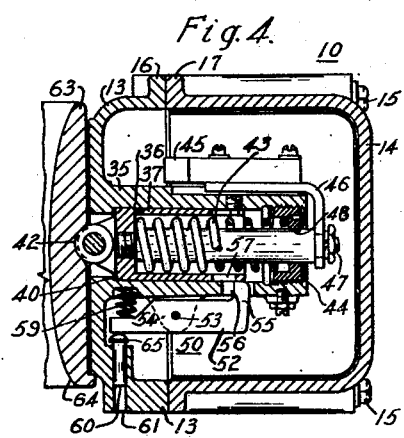
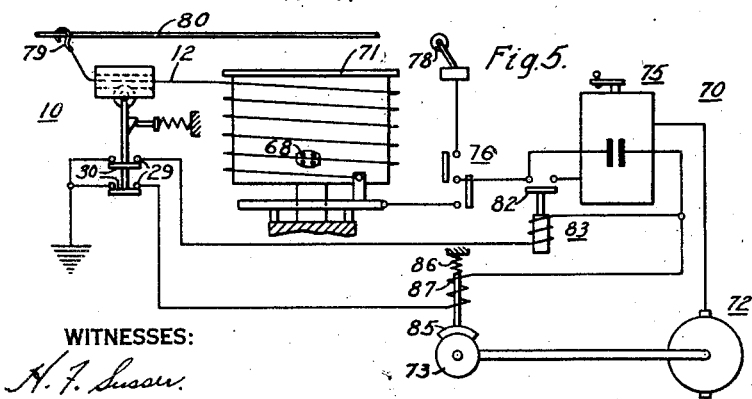
WITNESSES:
INVENTOR
Eugene D. Reiber
BY
ATTORNEY Patented Aug. 19, 1947

2,426,051

UNITED STATES PATENT OFFICE 2,426,051

CONTROL SWITCH

Eugene D. Reiber, Manor, Pa., assignor to Westinghouse Electric Corporation, East Pittsburgh, Pa., a corporation of Pennsylvania Application December 12, 1942, Serial No. 468,771

3 Claims. (Cl. 200—52)

My invention relates generally to control devices, and it refers in particular to control systems and devices for preventing overrun of cable reels used on mining locomotives and the like.

Generally stated, it is an object of my invention to prevent overrunning of locomotive cable reels in a manner that is both simple and inexpensive.

More specifically, it is an object of my invention to provide for controlling the operation of cable reel locomotives to prevent the cable from being unwound from the reel beyond a predetermined point.

It is also an object of my invention to provide for operating a control switch in response to the unwinding movement of the cable from a reel to deenergize the locomotive and/or apply the locomotive brakes when the cable has been unwound from the reel as far as is permissible.

Another object of my invention is to provide a control switch which may be operated in connection with a cable guide on a locomotive to stop the locomotive when the cable becomes unwound from its reel a predetermined amount.

Yet another object of my invention is to provide for operating a locomotive control switch in response to movement of a movable portion of a cable guide.

Other objects will, in part, be obvious and will, in part, be explained hereinafter.

In accordance with my invention, a cable guide on a cable reel locomotive may be provided with a removable core through which the cable passes. The outer surface of the core is provided with a recess wherein normally rests a plunger which is actuable to operate a control switch. An obstruction is provided on the cable at an appropriate point which engages the core member and actuates the control switch, thereby effecting deenergization of the locomotive motor and/or effecting application of the brakes so as to stop the locomotive and prevent overrunning of the cable.

For a more complete understanding of the nature and scope of my invention, reference may be had to the following detailed description which may be read in connection with the accompanying drawing, in which:

Figure 1 is a partially sectioned elevational view of a control switch embodying the principal features of the invention;

Fig. 2 is a sectional view taken along the line II—II of Fig. 1;

Fig. 3 is a sectional view taken along the line III—III of Fig. 1;

Fig. 4 is a sectional view taken along the line IV—IV of Fig. 1; and

Fig. 5 illustrates schematically a control system embodying the principal features of the invention.

Referring to Figures 1 through 4, the reference numeral 10 may denote generally a control switch arranged to be operated in response to predetermined movement of a cable, such as the power cable 12 of a locomotive or the like. The control switch may, for example, comprise a casing having a base portion 13 and a cover portion 14 secured thereto by the bolts 15. The base portion and cover portion may be provided with engaging flanges 16 and 17, respectively, which may be suitably machined to provide an explosion-proof joint therebetween. A guide support 18 may be provided on the base portion for receiving and guiding cable 12, and a stud 19 may be associated therewith to provide a swivel connection with an insulating bushing 20 whereby the switch may be mounted on a locomotive frame or the like.

The switch mechanism may be of any suitable construction, comprising, for example, a pair of contact arms 22 and 23 which may be pivotally mounted on a panel 24 of insulating material by means of U-shaped brackets 25 and pins 26. The panel may be supported on the base 13 by means of bolts 27 and spacers 28. Terminal members 29 may be mounted on the panel 24 in spaced relation and arranged to be bridged by means of a pair of contact members 30 which may be mounted on the contact arms 22 and 23, as is best shown in Fig. 3. Rollers 32 may be mounted on the upper ends of the contact arms by means of the pin 33.

As best shown in Figs. 3 and 4, the base portion 13 of the casing may be provided with an inwardly projecting boss 35 having a central bore 36 arranged to receive a substantially cylindrical plunger 37. The outer end of the bore may terminate in an opening 39 in the guide support 18, and may be slightly reduced in size to provide a peripheral shoulder 40 adjacent the outer end of the bore 36 to prevent the plunger 37 from projecting therefrom more than a predetermined amount. A roller 42 may be rotatably mounted on the projecting end portion of the plunger to project into the guide support opening 39.

In order to normally bias the plunger 37 toward the outer or guide support end of the bore 36, a spring 43 may be positioned within the plunger and adjustably tensioned by means of a cap member 44 which may be threaded into the inner end of the bore 36. For the purpose of operating the switch arms 22 and 23 in response to movement of the plunger 37, an operating arm 45 may be provided. The arm 45 may be suitably connected to the plunger 37, being, for example, secured to a substantially L-shaped bracket 46 which may be connected to the plunger by means of a stud 47 projecting through an opening 48 in the cap member 44.

The plunger 37 may be provided with suitable locking means, denoted generally by the numeral 50 to retain the plunger in the operated position. For example, a latch member 52 may be pivotally mounted by means of a pin 53 and projection 54 on the central boss 35, having an end portion 55 arranged to project through an opening 56 in the boss portion into an opening 57 in the plunger 37 when it is actuated to the operated position. A spring 59 may be provided for biasing the latch member 52 to engage the opening 56 in the plunger. Suitable means may be provided for resetting the latch member, such as the latch pin 60, which may be slidably positioned in an opening 61 in the base portion of the casing and arranged to engage the end of the latch member adjacent the spring 59.

In order to effect operation of the plunger 37 to actuate the switch arms 22 and 23 in response to predetermined movement of the cable 12, the guide support 18 may be arranged to receive a removable sleeve or core member 63 in the opening 39 and normally maintain it in predetermined relation to the plunger 37. The core member 63 may be made of any suitable metal, insulating material, or the like, and may be provided with a tapered central opening 64 which receives and normally functions to guide the cable 12. About the periphery of the core member 63 a groove or recess 66 may be provided, wherein the roller 42 of the plunger 37 may be normally seated. A flange 67 may be provided at one end of the core member to engage the guide support 18 and permit readily aligning the groove 66 with the roller 42.

To effect movement of the core 63 from its normal position, so as to operate the switch arms 22 and 23, and thereby separate contact members 30 from the terminal members 29, suitable means may be provided on the cable 12 such as, for example, the split sleeve or obstruction 68. The sleeve 68 is of sufficient size to jam in the opening 64, thus forcing the core 63 from its normal position and moving the roller 42 and plunger 37 longitudinally against the spring 43 so as to effect operation of the switch arms 22 and 23.

Referring to Fig. 5, the reference numeral 70 denotes generally a locomotive control system wherein the control switch 10 is utilized to prevent overrunning of a cable 12 on its cable reel 71. The vehicle motor denoted generally by the numeral 72 is shown as directly connected to one of the locomotive wheels 73 merely in order to simplify the diagram, and it is to be understood that the arrangement of the different elements as herein shown is merely illustrative. The motor 72 may be normally connected through a controller 75 and transfer switch means 76 to either a trolley type current collector 78 or through the cable 12 and a suitable tap device 79 direct to the trolley conductor 80.

Additional means such as the line switch 82 having an operating winding 83 may be provided for disconnecting the motor 72 from the cable 12. Suitable braking means may also be provided for the locomotive, being either electropneumatic, hydraulic, or, as shown for purposes of illustration, electromagnetic, and provided with a brake shoe 85 normally biased against the wheel 73 by means of the spring 86. An operating winding 87 may be provided for actuating the shoe 85 away from the wheel 73 when the locomotive is operating.

In order to prevent overrunning of the cable 12 from the cable reel 71, the switch means 10 may be arranged to interrupt the energizing circuit for the operating winding 83 of the switch 82 and/or the operating winding 87 of the brake means. When the cable 12 becomes unwound from the reel 71 a predetermined amount, the sleeve or obstruction 68 engages the core member 63, moving it from its normal position in the guide support 18. The plunger 37 is thereby actuated since the roller 42 is depressed by the sloping sidewall of the groove 66 in the sleeve. Accordingly, the arm 45 is actuated to engage the rollers 32 and effect operation of the contact arms 22 and 23, and separates the contact members 30 from the terminal members 29. The energizing circuits for the operating windings 83 and 87 of the switch 82 and the brake means, respectively are interrupted. The energizing circuit of the motor 72 is thereby interrupted, and the brake shoe 85 is applied to the wheel 73, effectively stopping the vehicle and preventing overrunning of the cable 12.

From the above description and the accompanying drawing, it will be apparent that I have provided in a simple and inexpensive manner for preventing operation of cable reel locomotives beyond the point where the cable may become detached from the reel. Such a system provides automatically for protecting the cable and relieves the operator from having to constantly watch the cable during cable operation of the locomotive to determine whether or not he has reached the maximum point of cable unwinding. By utilizing my invention, anti-overrunning protection may readily be applied to existing as well as new apparatus without requiring any changes in the existing apparatus other than the substitution of the switch and cable guide for the usual cable guide, and the attachment of a suitable obstruction or other operating means to the cable at the desired point. These changes may be readily made and involve only a minimum of expense.

Since certain changes may be made in the above described apparatus and different embodiments of the invention may be made without departing from the spirit thereof, it is intended that all matter contained in the above description or shown in the accompanying drawing shall be considered as illustrative and not in a limiting sense.

I claim as my invention:

1. A cable operated switch comprising, an explosion-proof casing, a pivoted switch arm mounted in the casing to engage a stationary contact member, a plunger having a portion extending through the casing operable to actuate the switch arm, and a cable guide comprising an elongated support attached to the casing and having an axial opening, said support being provided with a movable core member in the axial opening having an opening to receive the cable and a peripheral recess to receive the projecting portion of the plunger, said movable core member being readily removable from the support by an obstruction on the cable, whereby the switch actuating plunger is operated in response to a predetermined movement of the cable without appreciably straining the cable.

2. A switch comprising, an explosion-proof casing, switch means mounted in the casing having a pivoted switch arm, a spring biased plunger projecting through the casing and actuable to operate the switch arm, and guide means for a cable including a swivel support attached on the outside of the housing and having a movable core removably positioned therein with an opening to receive the cable and a peripheral recess to normally receive the projecting portion of the plunger, said movable core being disposed for actuation by means attached to the cable which readily removes the core from the support without appreciably straining the cable and actuates the plunger to operate the switch arm, and lock means operable to lock the plunger in the actuated position.

3. A control switch comprising, a support having an opening, a sleeve removably positioned in the opening having a flange adjacent one end adapted to engage a portion of the support to position the sleeve in a predetermined position therein, said sleeve having a peripheral recess intermediate its ends, said sleeve having an opening to receive a cable and disposed to be removed from the support by an obstruction secured to the cable, normally closed switch means mounted on the support, a plunger carried by the support and having an end portion normally positioned in the recess of the sleeve, said plunger being actuated in response to movement of the sleeve from the opening in the support to operate the switch means, locking means operable to retain the switch means in the operated position, and resetting means operable to return the switch means to the closed position.

EUGENE D. REIBER.

REFERENCES CITED

The following references are of record in the file of this patent:

UNITED STATES PATENTS

| Number | Name | Date |
| --- | --- | --- |
| 1,772,548 | Levin | Aug. 12, 1930 |
| 1,681,385 | Avera | Aug. 21, 1928 |
| 1,545,627 | Wohlers | July 14, 1925 |
| 1,357,900 | Redmon | Nov. 2, 1920 |
| 1,364,805 | Redmon | Jan. 4, 1921 |
| 1,874,804 | Reese | Aug. 30, 1932 |
| 292,687 | Scott | Jan. 29, 1884 |
| 1,545,585 | Koch | July 14, 1925 |
| 1,629,998 | Field | May 24, 1927 |
| 1,638,905 | Aalborg | Aug. 16, 1927 |
| 1,902,765 | Dietsch | Mar. 21, 1933 |
| 1,926,419 | Apple | Sept. 12, 1933 |